(12) United States Patent
Woo et al.

(10) Patent No.: US 8,356,403 B2
(45) Date of Patent: Jan. 22, 2013

(54) DEVICE FOR ASSEMBLING VEHICLE BODY

(75) Inventors: Young Sub Woo, Chungcheongnam-do (KR); Woo Dong Hwang, Gyeonggi-do (KR)

(73) Assignee: Hyundai Motor Company, Seoul (KR)

(*) Notice: Subject to any disclaimer, the term of this patent is extended or adjusted under 35 U.S.C. 154(b) by 578 days.

(21) Appl. No.: 12/615,649

(22) Filed: Nov. 10, 2009

(65) Prior Publication Data

US 2010/0287767 A1   Nov. 18, 2010

(30) Foreign Application Priority Data

May 13, 2009   (KR) .................. 10-2009-0041812

(51) Int. Cl.
  *B23P 21/00* (2006.01)
  *B23P 19/00* (2006.01)
  *B23P 11/00* (2006.01)
(52) U.S. Cl. ............. 29/823; 29/430; 29/822; 29/795; 29/771; 29/787; 29/464; 228/212
(58) Field of Classification Search .......... 29/430, 29/771, 787, 795, 823, 822, 464; 228/212, 228/44.3; 269/71, 75, 55, 60
See application file for complete search history.

(56) References Cited

U.S. PATENT DOCUMENTS

| | | | | |
|---|---|---|---|---|
| 4,785,528 A | * | 11/1988 | Soderberg | 29/701 |
| 4,876,786 A | * | 10/1989 | Yamamoto et al. | 29/429 |
| 5,265,317 A | * | 11/1993 | Angel | 29/429 |
| 5,311,659 A | * | 5/1994 | Barnhart et al. | 29/823 |
| 5,347,700 A | * | 9/1994 | Tominaga et al. | 29/430 |
| 5,456,002 A | * | 10/1995 | Barnhart et al. | 29/787 |
| 5,479,698 A | * | 1/1996 | Angel | 29/701 |
| 6,344,629 B1 | * | 2/2002 | Kato et al. | 219/148 |
| 6,467,675 B1 | * | 10/2002 | Ozaku et al. | 228/175 |
| 6,835,909 B2 | * | 12/2004 | Nakamura et al. | 219/86.7 |
| 6,883,230 B2 | * | 4/2005 | Matsumoto et al. | 29/822 |
| 6,944,927 B2 | * | 9/2005 | Nakamura | 29/407.01 |
| 6,991,412 B2 | * | 1/2006 | Dorrian | 410/43 |
| 7,168,145 B2 | * | 1/2007 | Sawada et al. | 29/423 |
| 7,338,238 B2 | * | 3/2008 | Dorrian | 410/43 |
| 7,448,529 B2 | * | 11/2008 | Motomi et al. | 228/212 |
| 7,469,473 B2 | * | 12/2008 | Savoy | 29/897.2 |
| 7,506,433 B2 | * | 3/2009 | Sawada et al. | 29/822 |
| 7,568,279 B2 | * | 8/2009 | Lohman et al. | 29/709 |
| 7,607,212 B2 | * | 10/2009 | Nakamura | 29/559 |
| 2004/0084590 A1 | * | 5/2004 | Dorrian | 248/300 |
| 2005/0017057 A1 | * | 1/2005 | Motomi et al. | 228/212 |
| 2005/0141979 A1 | * | 6/2005 | Dorrian | 410/43 |
| 2007/0114709 A1 | * | 5/2007 | Sawada et al. | 269/47 |
| 2008/0000069 A1 | * | 1/2008 | Savoy | 29/430 |
| 2009/0272723 A1 | * | 11/2009 | Jeong | 219/121.63 |
| 2010/0038837 A1 | * | 2/2010 | Demit et al. | 269/86 |
| 2010/0319182 A1 | * | 12/2010 | Sugimoto et al. | 29/428 |

(Continued)

FOREIGN PATENT DOCUMENTS

| | | | |
|---|---|---|---|
| JP | 02284828 A | * | 11/1990 |
| JP | 2002-225759 A | | 8/2002 |

(Continued)

*Primary Examiner* — Essama Omgba
(74) *Attorney, Agent, or Firm* — Edwards Wildman Palmer LLP; Peter F. Corless

(57) ABSTRACT

The present invention relates to a device for assembling a vehicle body, and more particularly to a device for assembling a vehicle body that is capable of corresponding to various models of vehicles in a process of manufacturing a vehicle body.

17 Claims, 9 Drawing Sheets

U.S. PATENT DOCUMENTS

2011/0140330 A1 * 6/2011 Nishikawa et al. ............. 269/55

FOREIGN PATENT DOCUMENTS

| | | | | |
|---|---|---|---|---|
| KR | 2004039991 | A | * | 5/2004 |
| KR | 2004105488 | A | * | 12/2004 |
| KR | 10-2006-0064374 | A | | 6/2006 |
| KR | 2007004206 | A | * | 1/2007 |
| KR | 2009048865 | A | * | 5/2009 |
| WO | WO 2011059167 | A1 | * | 5/2011 |

* cited by examiner

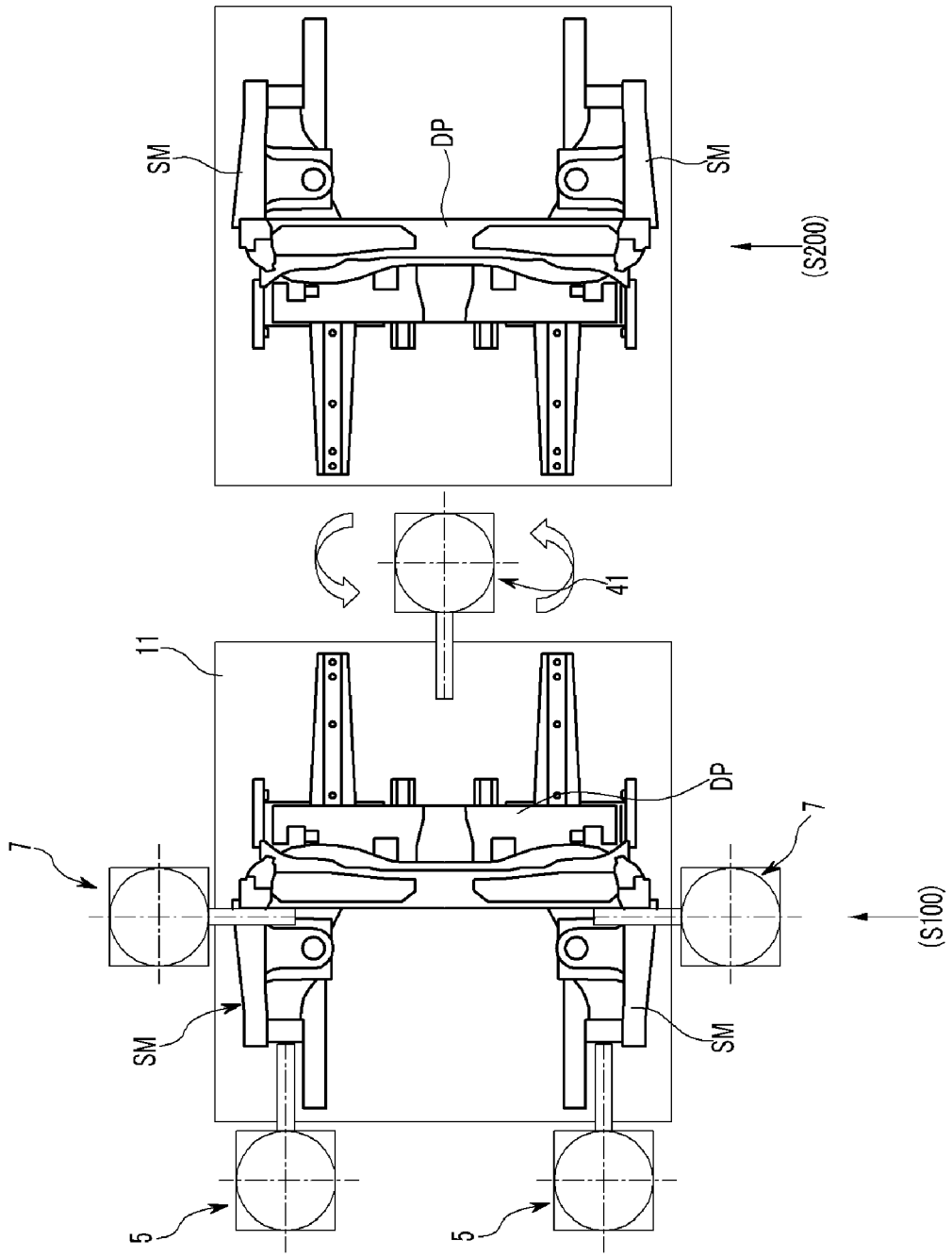

DEVICE FOR ASSEMBLING VEHICLE BODY

CROSS-REFERENCE TO RELATED APPLICATION

This application claims priority to and the benefit of Korean Patent Application No. 10-2009-0041812 filed in the Korean Intellectual Property Office on May 13, 2009, the entire contents of which are incorporated herein by reference.

BACKGROUND OF THE INVENTION (a) Field of the Invention

The present invention relates to a device for assembling a vehicle body. In preferred embodiments, the present invention relates to a device for suitably assembling a vehicle body that is capable of corresponding to various models of vehicles during the process of manufacturing a vehicle body.

(b) Description of the Related Art

In a vehicle manufacturing line, a vehicle is formed by assembling twenty to thirty thousand parts in various assembly lines and welding processes.

Recently, as the number of models of a vehicle in a process of manufacturing vehicle bodies has been increased according to various demands of clients, many companies have adopted a mixed product production method such that various vehicle bodies are suitably produced on the same line.

A mixed product production method may be used because the space for loading of products is not sufficient, and manufacturing cost is increased due to a reduction in specialization in the case of configuring various devices for various vehicle bodies.

The process method allows the manufacture of a vehicle body according to various demands of clients, in comparison with a process method of manufacturing one model of vehicle.

However, if various vehicles are loaded on the same production line, resulting in complication of equipment, space for the equipment needs to be increased.

Therefore, it is necessary to minimize the space for production by simplifying the equipment, and to reduce manufacturing cost.

FIG. 1 shows an exemplary production line of a circulation type using carriages for coping with the conventional mixed product production method. FIG. 2 shows an exemplary production line of a linear type using carriages for coping with the conventional mixed product production method.

The production line of the circulation type using carriages, as shown in FIG. 1, preferably includes a parts loading process P1 loading parts on a carriage along a process line, a welding process P2 performing a welding process by using an operation of a robot, and an assembling line P transporting an assembly that is completed at the welding process to unloading a an process P3.

Further, carriage return lines R, R1, R2, and R3 are suitably installed beside the assembling line P so as to return a complete carriage and transport the appropriate carriage according to a signal indicating a model of vehicle to the parts loading process P1.

The production line of the linear type using carriages, for example as shown in FIG. 2, includes parts-loaded-carriages provided therewith so that it moves reciprocally along a linear rail LR connecting a parts loading process S1 and a parts unloading process S2, a stand-by process S3 at both sides of the linear rail LR so as to prepare various kinds of vehicles, and a welding process S4 suitably performing welding process according thereto.

The parts-loaded-carriages reciprocally move along the linear rail LR, and an appropriate model according to a signal indicating a model of vehicle moves from the stand-by process S3 to the parts loading process S1.

Then, the carriage moves to the welding process S4 for being welded by a robot, and complete assembly parts are suitably transported to a transporter at the parts unloading process S2, and subsequently, the complete carriage is returned to the stand-by process S3.

However, in using the mixed product production method the jig is complicated due to a limit of the various kinds of parts for a vehicle, where many kinds of carriages according to each model are required, and so further return lines and equipment are required according to each model.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention provides a device for assembling a vehicle body that corresponds to various models of vehicles in a process of manufacturing a vehicle body that is capable of being applied to a mixed product production method.

In preferred embodiments of the present invention, a device for assembling a vehicle body in order to assemble a dash panel to a left side member and a right side member may include, but is not be limited only to:

at least three sets of locate units that are suitably disposed at both sides of a base plate, hold side members through a clamping pin suitably inserted into a tooling hole formed at a lower portion of the side members, and control the side members to move in four directions or a vertical direction by three servo motors; a robot hanger unit suitably disposed at the front end of an arm of a handling robot that is suitably disposed at the front side of the base plate in order to load the dash panel between the side members held by the locate unit in a state in which the clamping pin is inserted into a tooling hole formed at a surface of the dash panel, and at the same time to transport the side members and the dash panel assembly to a parts unloading process; a parts loading robot respectively disposed at both sides of rearward of the base plate so as to clamp the left/right side members, and to load the side members to the locate unit; and a welding robot integrally provided with a spot welding gun at the front end thereof and suitably disposed at both sides of the base plate so as to weld abutments of the side members and the dash panel.

In other preferred embodiments, the locate unit may include, but is not limited only to:

a main plate that is suitably mounted at one side of the base plate; a longitudinal rail mounted at the main plate in a longitudinal direction; a longitudinal rail block slidably mounted at the longitudinal rail; a longitudinal drive member suitably connected to the longitudinal rail block in a state of being arranged on the main plate along one side of the longitudinal rail so as to slidably move the longitudinal rail block along the longitudinal rail by using a rotating force; a rail plate suitably mounted on an upper surface of the longitudinal rail block; a traverse rail traversely mounted on the rail plate; a traverse rail bock slidably mounted at the traverse rail; a traverse drive member connected to the traverse rail block in a state of being arranged on the rail plate along one side of the traverse rail so as to slidably move the traverse rail block along the traverse rail by using a rotating force; a slide guider perpendicularly mounted at an upper surface of the traverse rail block; a vertical slider slidably mounted on the slide guider so as to be moved upward and downward; a vertical drive member connected to the vertical slider in a state of being arranged perpendicularly on the traverse rail block along one side of the slide guider so as to slidably move the vertical slider along the slide guider by using the rotating force; and a pin clamping member suitably disposed at an upper end of the vertical slider so as to hold the parts by using air pressure in a state in which a clamping pin is inserted into the tooling hole.

According to other preferred embodiments, the longitudinal drive member may include, but is not limited only to:

a longitudinal servo motor that is suitably mounted on the main plate along one side of the longitudinal rail through a mounting block and that is provided with a rotating shaft formed by a screw bar; and a longitudinal screw block suitably disposed at a surface of the longitudinal rail block so that it is engaged with the screw bar of the longitudinal servo motor.

In other preferred embodiments, the traverse drive member may include, but is not limited only to:

a traverse servo motor that is suitably mounted on the rail plate through a support block along one side of the traverse rail and that is provided with a rotating shaft formed of a screw bar; and a traverse screw block suitably disposed at a surface of the traverse rail block so that a vertical screw block is engaged with the screw bar of the traverse servo motor.

In further preferred embodiments, the vertical drive member may include, but in not only limited to:

a vertical servo motor that is perpendicularly mounted on the traverse rail block along one side of the slide guider and that is provided with a rotating shaft formed of a screw bar; and a vertical screw block suitably disposed at a surface of the vertical slider and engaged with the screw bar of the vertical servo motor.

In other preferred embodiments, the pin clamping member may include, but is not limited only to:

an air pressure cylinder perpendicularly suitably mounted at an upper end of the vertical slider; and a clamping pin suitably connected to an operating rod of the air pressure cylinder in a state of being mounted at an upper end of the air pressure cylinder so as to rotate a clamper disposed therein.

Preferably, in other certain embodiments, the robot hanger unit may include, but is not limited only to:

a hanger frame of a double pipe structure of which the middle portion thereof is fixed to the front end of the handling robot, and aluminum expanded foam is suitably inserted therein; a pushing member disposed at both ends of the hanger frame so as to support both sides of the dash panel; a central pin clamping member suitably disposed at a lower side of the center of the hanger frame so as to insert the clamping pin into a tooling hole suitably disposed at a surface of the dash panel and hold the dash panel and that is operated by air pressure; and left/right pin clamping members slidably mounted at both sides of the hanger frame with respect to the center thereof through which the clamping pin is inserted into the tooling holes formed at a surface of the dash panel so as to hold the dash panel by using air pressure.

In further preferred embodiments, the pushing member may include, but is not limited only to:

a rod housing suitably mounted respectively at both ends of the hanger frame; a pushing rod slidably inserted into the rod housing; a rubber pad suitably mounted at the front end of the pushing rod; and a spring mounted on the pushing rod in a state in which one end thereof is suitably supported by the rubber pad and the other end thereof is suitably supported by the rod housing.

According to further preferred embodiments, the central pin clamping member may include, but is not only limited to:

a central air cylinder suitably fixed to a lower side of the center of the hanger frame; and a central clamping pin suitably connected to the operating rod of the central air cylinder in a state of being mounted at the front end of the central air cylinder so as to rotate a clamper disposed therein.

Preferably, in certain embodiments, the left/right pin clamping members may include, but are not limited only to:

left/right air cylinders slidably mounted at both sides thereof along an axial direction with respect to the center of the hanger frame; and left/right clamping pins suitably connected to the operating rod of the left/right air cylinders in a state of being mounted at the front end of the left/right air cylinders so as to rotate the clamper disposed therein.

Preferably, the device for assembling a vehicle body according to an exemplary embodiment of the present invention can suitably correspond to various models of vehicles in a process of manufacturing a vehicle body, and can reduce the number of processes through which the left/right side members SM and the dash panel DP can be held by the locate unit of a three shaft servo control pin clamp type and the tooling hole in the same process, and then the left/right side members SM and the dash panel DP are welded by both robot hanger units 3 in a state in which the tooling hole is held by the robot hanger unit 3 of a pin clamp type.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum).

As referred to herein, a hybrid vehicle is a vehicle that has two or more sources of power, for example both gasoline-powered and electric-powered.

The above features and advantages of the present invention will be apparent from or are set forth in more detail in the accompanying drawings, which are incorporated in and form a part of this specification, and the following Detailed Description, which together serve to explain by way of example the principles of the present invention.

BRIEF DESCRIPTION OF THE DRAWINGS

FIG. 9 shows an assembling process of a device for assembling a vehicle body according to an exemplary embodiment of the present invention.

DETAILED DESCRIPTION

As described herein, the present invention includes a device for assembling a vehicle body comprising at least three sets of locate units disposed at both sides of a base plate, a robot hanger unit, a parts loading robot, and a welding robot.

In one embodiment, the locate units hold side members through a clamping pin inserted into a tooling hole formed at a lower portion of the side members, and control the side members to move in four directions or a vertical direction by three servo motors.

In another embodiment, the robot hangar unit is disposed at the front end of an arm of a handling robot disposed at the front side of the base plate in order to load the dash panel between the side members held by the locate unit in a state in which the clamping pin is inserted into a tooling hole formed at a surface of the dash panel, and at the same time to transport the side members and the dash panel assembly to a parts unloading process.

In another further embodiment, the parts loading robot is disposed at both sides of rearward of the base plate so as to clamp the left/right side members, and to load the side members to the locate unit.

In still another embodiment, the welding robot is integrally provided with a spot welding gun at the front end thereof and disposed at both sides of the base plate so as to weld abutments of the side members and the dash panel.

In another particular embodiment, the device is used to assemble a dash panel to a left side member and a right side member.

Exemplary embodiments of the present invention will hereinafter be described in detail with reference to the accompanying drawings.

Figure 1:
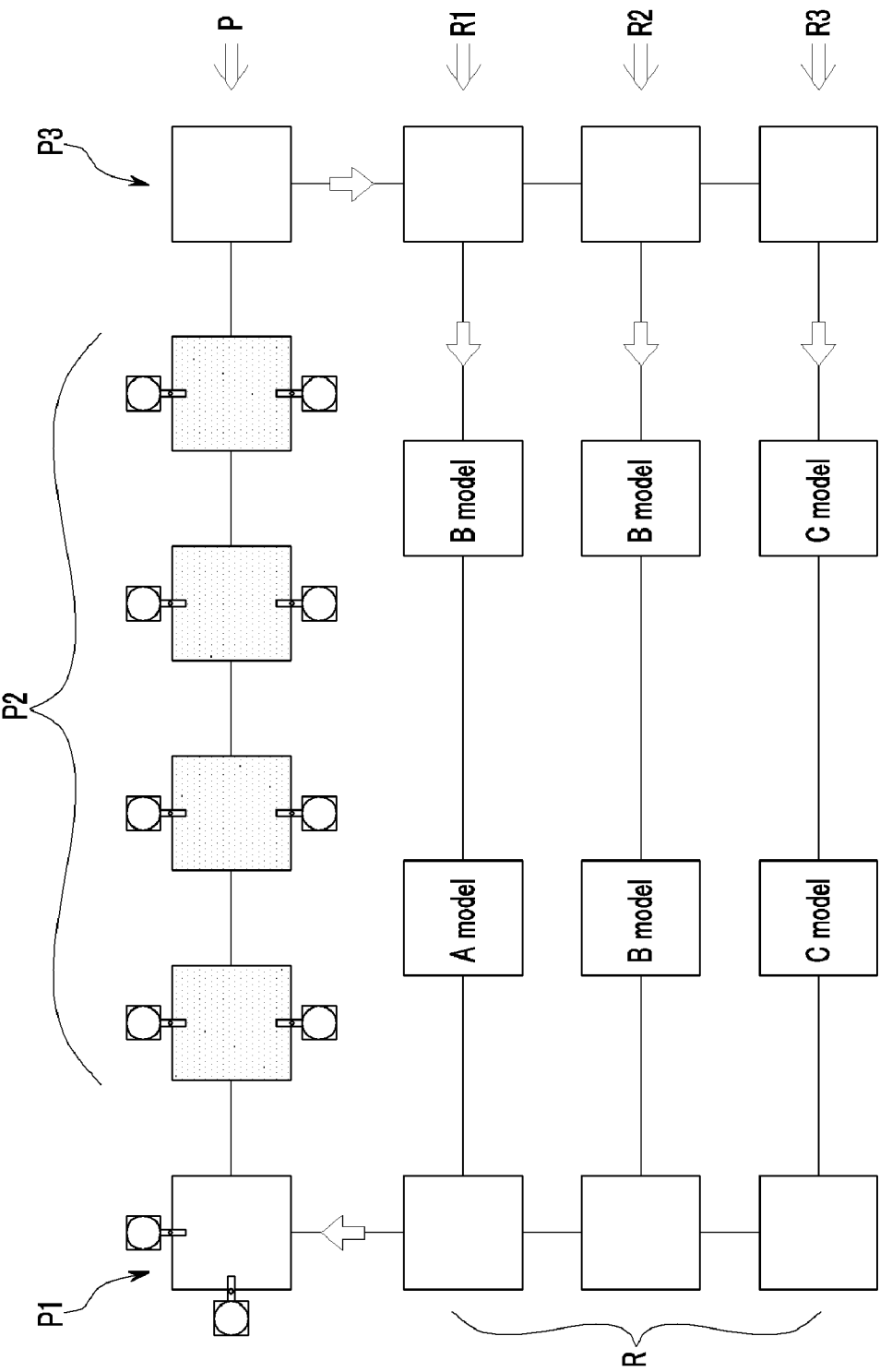
FIG. 1 shows an exemplary production line of a circulation type using carriages for coping with a conventional mixed product production method.
Figure 2:
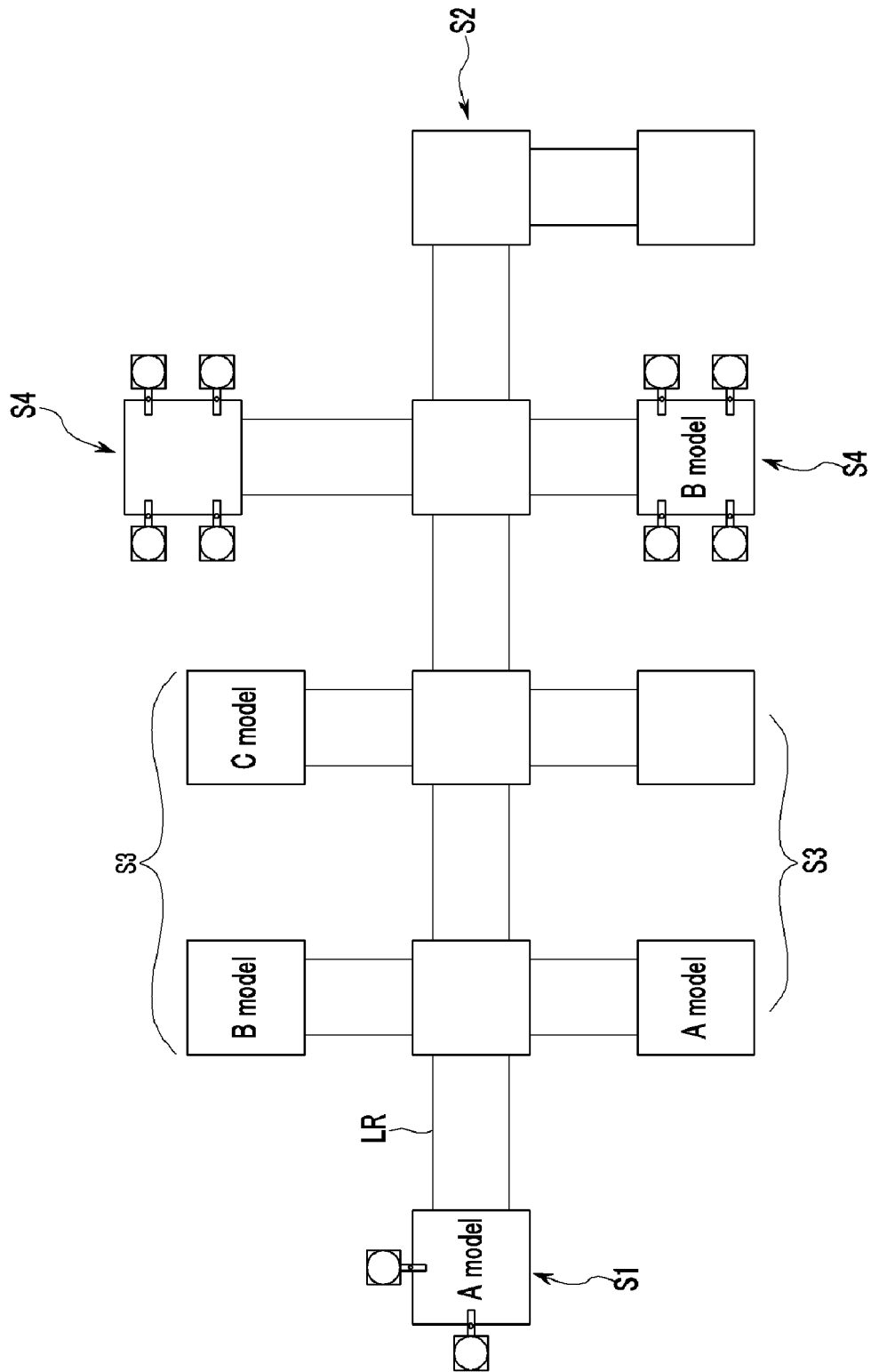
FIG. 2 shows an exemplary production line of a linear type using carriages for coping with the conventional mixed product production method.
Figure 3:
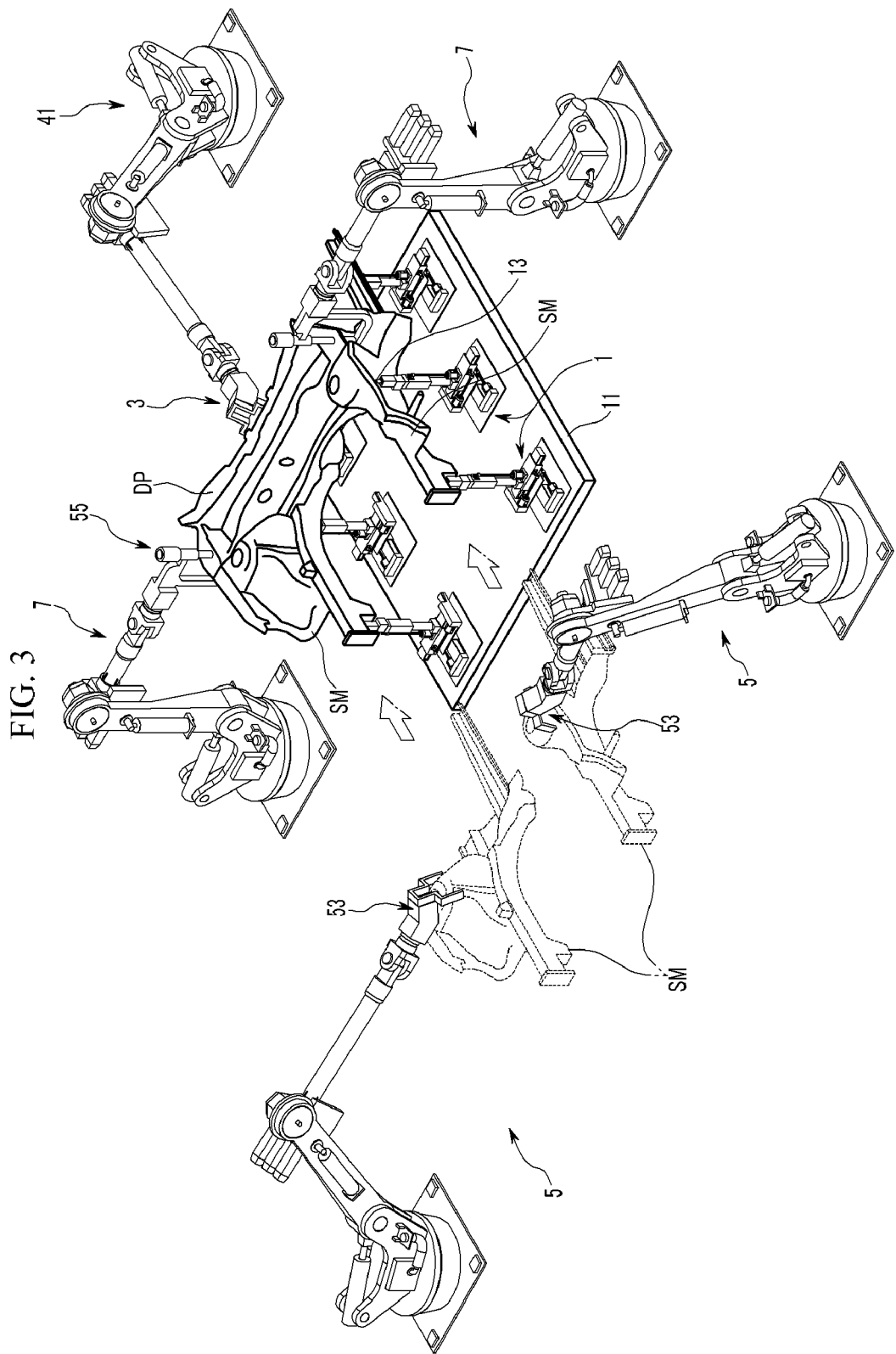
FIG. 3 is a perspective view of a device for assembling a vehicle body according to an exemplary embodiment of the present invention.

In one preferred embodiments, as shown in FIG. 3, FIG. 3 is a perspective view of a device for assembling a vehicle body according to an exemplary embodiment of the present invention.

Preferably, a device for assembling a vehicle body according to an exemplary embodiment of the present invention, as shown in FIG. 3, includes, but may not be limited only to, a locate unit 1, a robot hanger unit 3, a parts loading robot 5, and a welding robot 7 as a devices for suitably assembling a dash panel DP to left/right side members SM.

In one preferred embodiment, at least three sets of locate units 1 are suitably mounted on a base plate 11.

In another preferred embodiment, a clamping pin 13 is suitably inserted into a tooling hole of the each side member SM for holding the locate unit 1, and the clamping pin 13 is preferably controlled to be moved upward, downward, leftward, and rightward by the three servo motors M1, M2, and M3.

Figure 4:
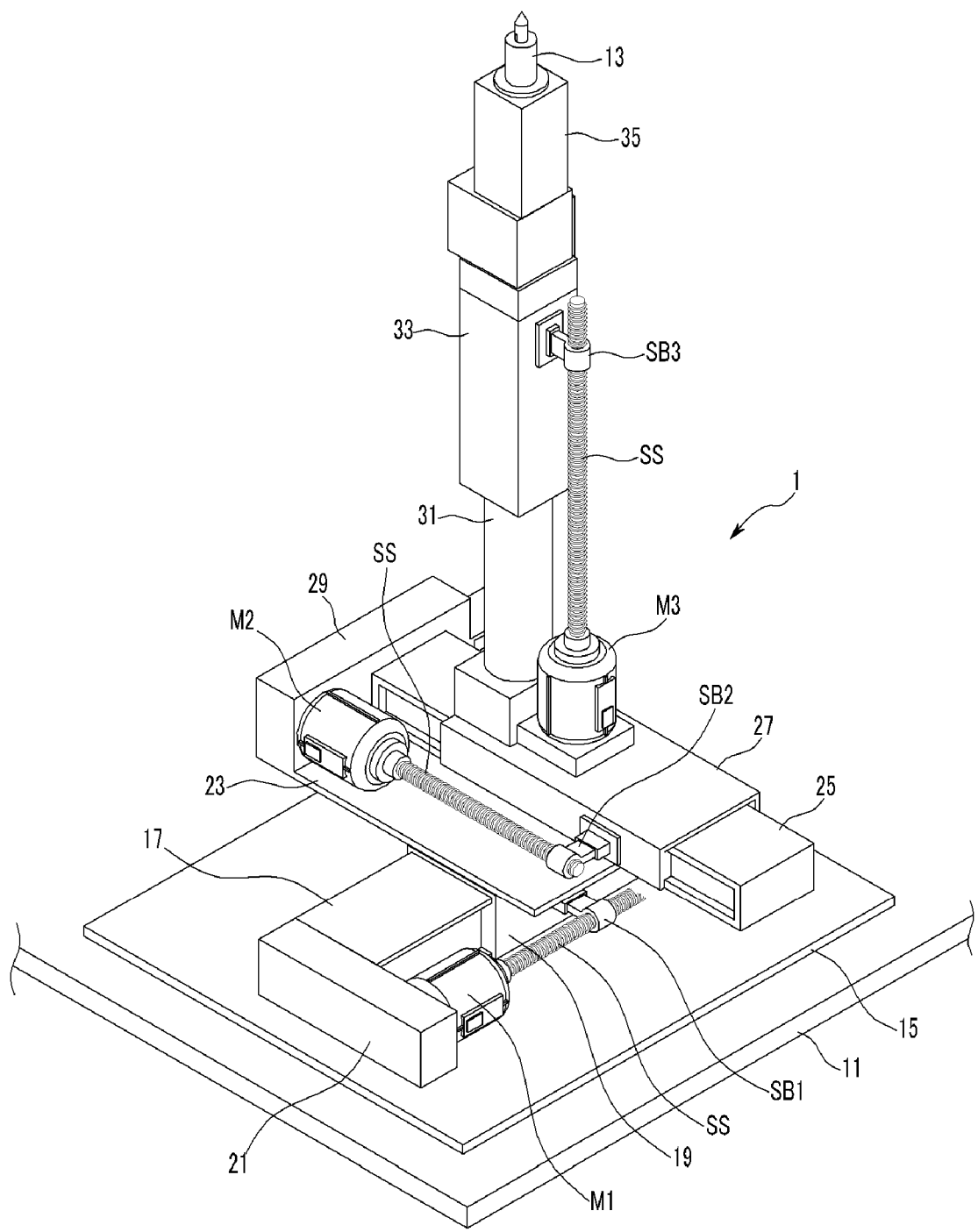
FIG. 4 is a perspective view of a locate unit applied to a device for assembling a vehicle body according to an exemplary embodiment of the present invention.

Preferably, each locate unit 1, as shown in FIG. 4, is provided with a main plate 11 at the left side and the right side of the base plate 15 so as to be arranged in two rows.

In a further related embodiment, a longitudinal rail 17 is suitably mounted on each main plate 15 in a longitudinal direction.

Preferably, a longitudinal rail block 19 is slidably mounted at the longitudinal rail 17.

In a further exemplary embodiment, a longitudinal drive member is connected to the longitudinal rail block 19 in a state of being longitudinally arranged on the main plate 15 along one side of the longitudinal rail 17 so as to slidably move the longitudinal rail block 19 along the longitudinal rail 17 by using rotating force.

Accordingly, in another preferred embodiment of the present invention, the longitudinal drive member includes a longitudinal servo motor M1 that is suitably mounted on the main plate 15 along one side of the longitudinal rail 17 through a mounting block 21 and that is preferably provided with a rotating shaft formed of a screw bar SS, and a longitudinal screw block SB1 suitably disposed at a surface of the longitudinal rail block 19 so that the longitudinal screw block SB1 is engaged with the screw bar SS of the longitudinal servo motor M1.

In another further embodiment, a rail plate 23 is suitably mounted on an upper surface of the longitudinal rail block 19, and a traverse rail 25 is traversely mounted on the rail plate 23.

Preferably, a traverse rail block 27 is slidably mounted on the traverse rail 25, and a traverse drive member is suitably provided to one side of the traverse rail 25.

In a related embodiment, the traverse drive member is suitably connected to the traverse rail block 27 in a state of being traversely arranged on the rail plate 23 so as to slidably move the traverse rail block 27 along the traverse rail 25 by using the rotating force.

In another related embodiment, the traverse drive member preferably includes a traverse servo motor M2 that is suitably mounted on the rail plate through a support block 29 along one side of the traverse rail 25 and that is provided with a rotating shaft formed by a screw bar SS, and a traverse screw block SB2 suitably disposed at a surface of the traverse rail block 27 so that the traverse screw block SB2 is engaged with the screw bar SS of the traverse servo motor M2.

Preferably, a slide guider 31 is perpendicularly mounted at an upper surface of the traverse rail block 27, and a vertical slider 33 is slidably mounted on the slide guider 31 so as to be moved upward and downward.

Further, according to preferred embodiments, a vertical drive member is suitably connected to the vertical slider 33 in a state of being arranged perpendicularly on the traverse rail block 27 along one side of the slide guider 31 so as to slidably move the vertical slider 33 perpendicularly by using the rotating force.

Preferably, the vertical drive member includes a vertical servo motor M3 that is perpendicularly mounted on the traverse rail block 27 along one side of the slide guider 31 and that is preferably provided with a rotating shaft formed of a screw bar SS, and a vertical screw block SB3 suitably disposed at a surface of the vertical slider 33 so that the vertical screw block SB3 is suitably engaged with the screw bar SS of the vertical servo motor M3.

In further preferred embodiments, a pin clamping member is suitably provided to an upper end of the vertical slider 33 so as to hold the parts by using air pressure in a state in which the clamping pin 13 is suitably inserted into the tooling hole.

Figure 5:
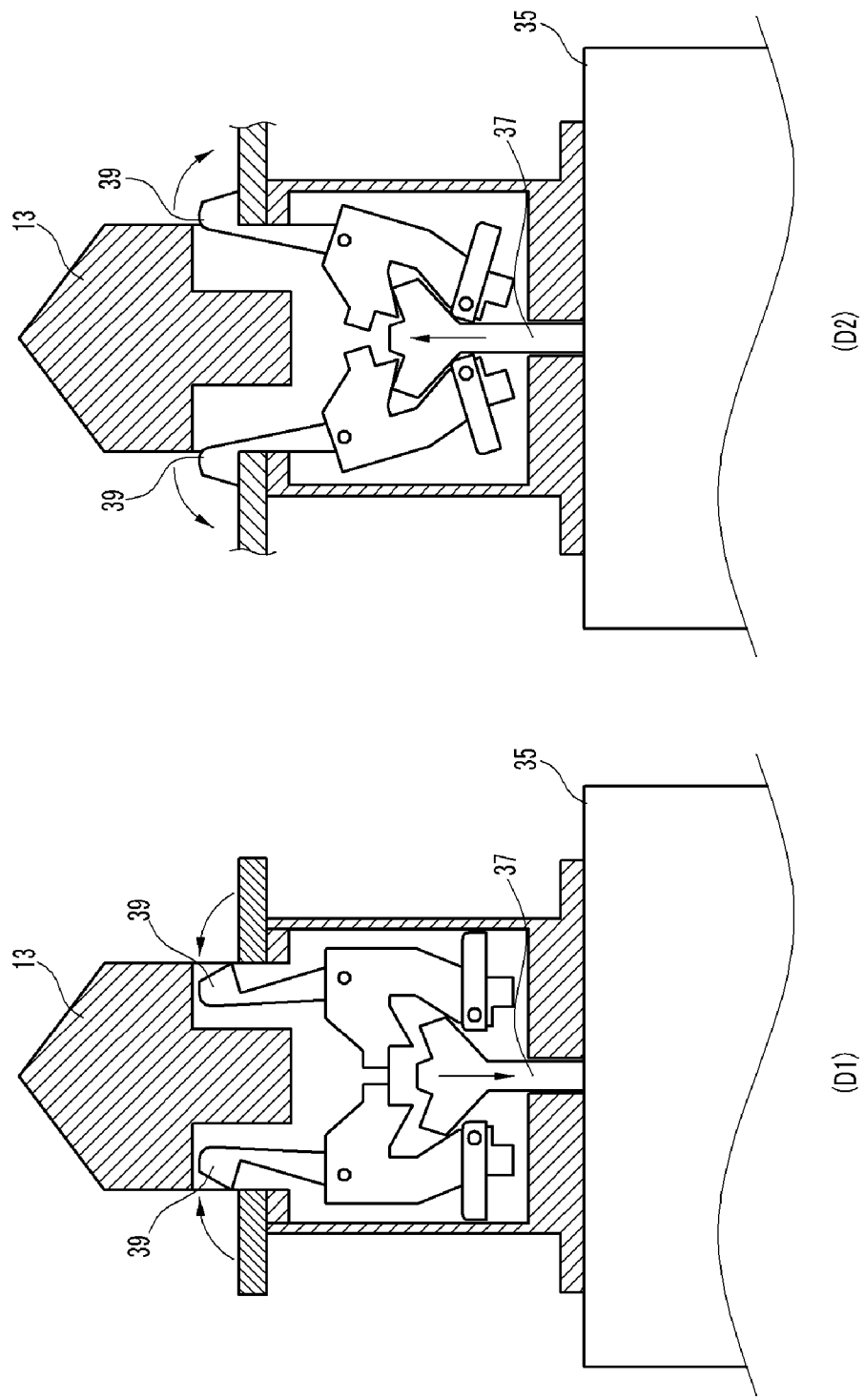
FIG. 5 is a cross-sectional view of a pin clamping member applied to a device for assembling a vehicle body according to an exemplary embodiment of the present invention.

Preferably, the pin clamping member, for example as shown in FIG. 5, includes an air pressure cylinder 35 perpendicularly mounted at an upper end of the vertical slider 33, and the clamping pin 13 suitably connected to an operating rod 37 of the air pressure cylinder 35 in a state of being mounted at an upper end of the air pressure cylinder 35 so as to rotate a clamper 39 disposed therein.

Figure 6:
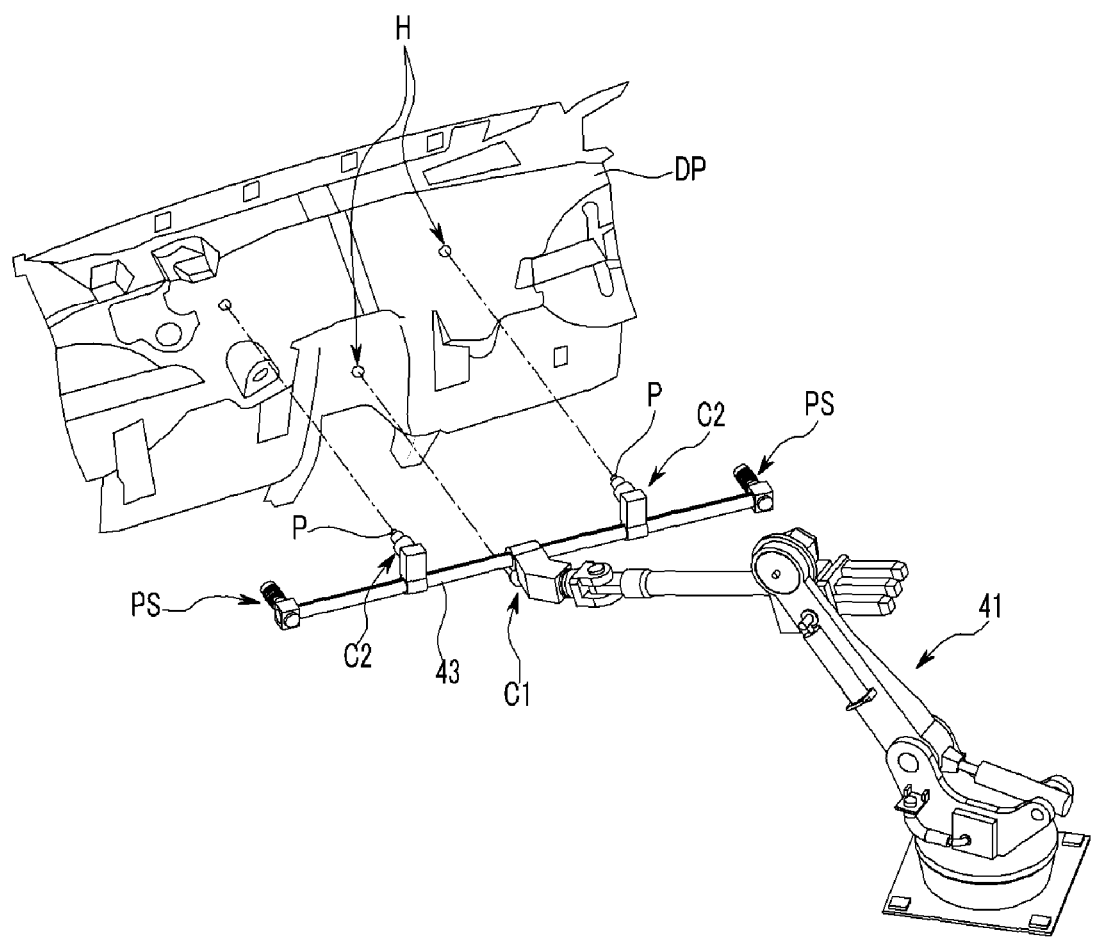
FIG. 6 is a perspective view of a robot hanger unit applied to a device for assembling a vehicle body according to an exemplary embodiment of the present invention.

In other preferred embodiments, for example as shown in FIG. 6, the robot hanger unit 3 suitably disposed at the front end of the base plate 11 is suitably mounted at an end of an arm of a handling robot 41, and the robot hanger unit 3 loads the dash panel DP between the members SM held at both sides by the locate unit 1 in a state in which clamping pin P is held by the tooling hole H formed at a surface of the dash panel DP.

Figure 7:
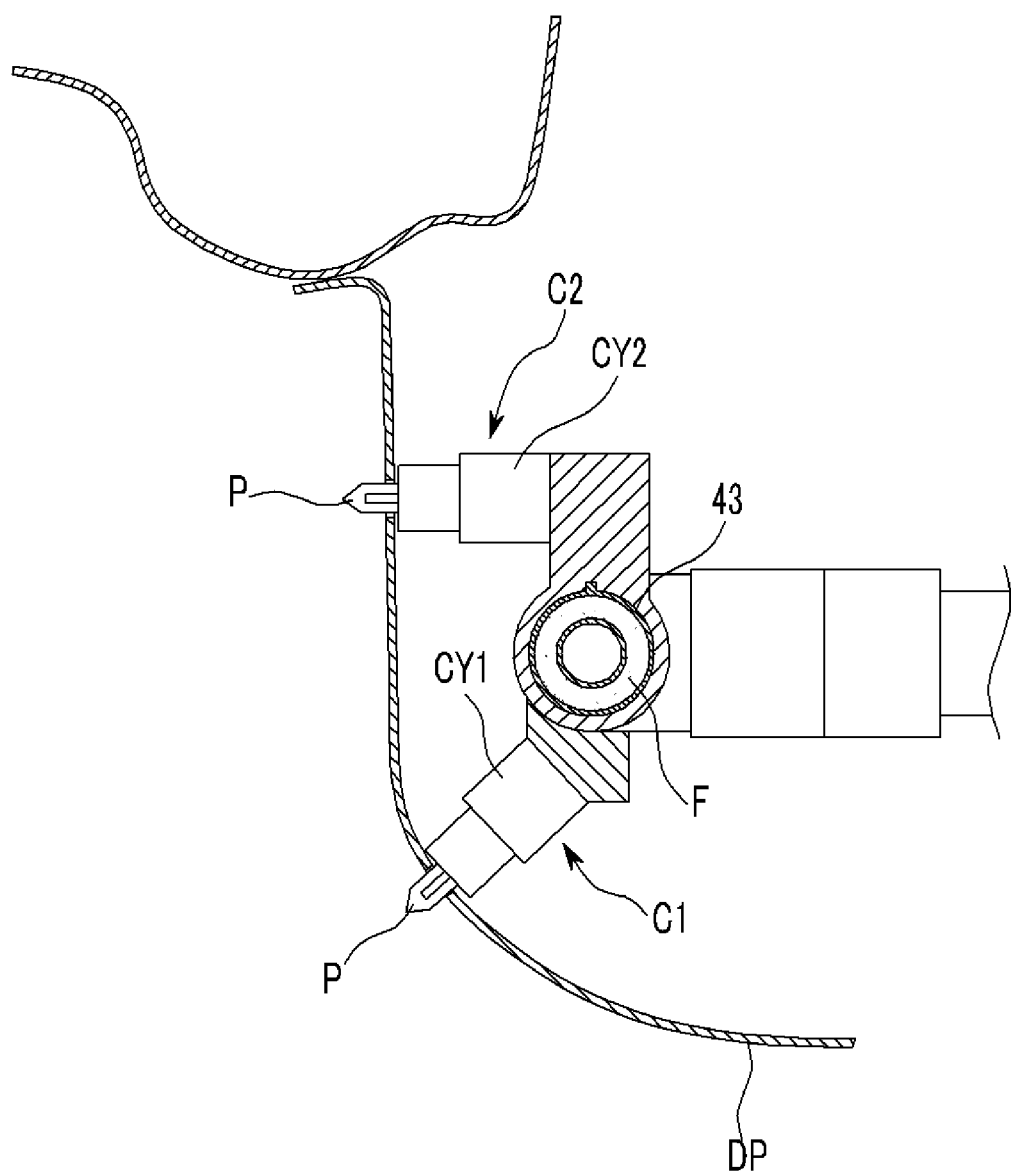
FIG. 7 is an exemplary cross-sectional view taken along the line A-A of FIG. 6.

In certain exemplary embodiments, the robot hanger unit 3, as shown in FIG. 7, preferably includes a hanger frame 43 of double pipe structure in which the middle portion thereof is suitably fixed to the front end of the handling robot 41, and aluminum expanded foam F is inserted therein.

Preferably, a pushing member PS is suitably disposed at both ends of the hanger frame 43 so as to support both sides of the dash panel DP.

Preferably, a clamping pin P is suitably inserted into a tooling hole H formed at a surface of the dash panel DP by air pressure in a lower side of the center of the hanger frame 43, and a central pin clamping member C1 is suitably provided so as to hold the dash panel DP.

In further preferred embodiments, the invention features left/right clamping members C2 that are slidably mounted at both sides with respect to the hanger frame 43, and hold the dash panel DP by inserting the clamping pin P into the tooling hole H formed at a surface of the dash panel DP with air pressure.

Figure 8:
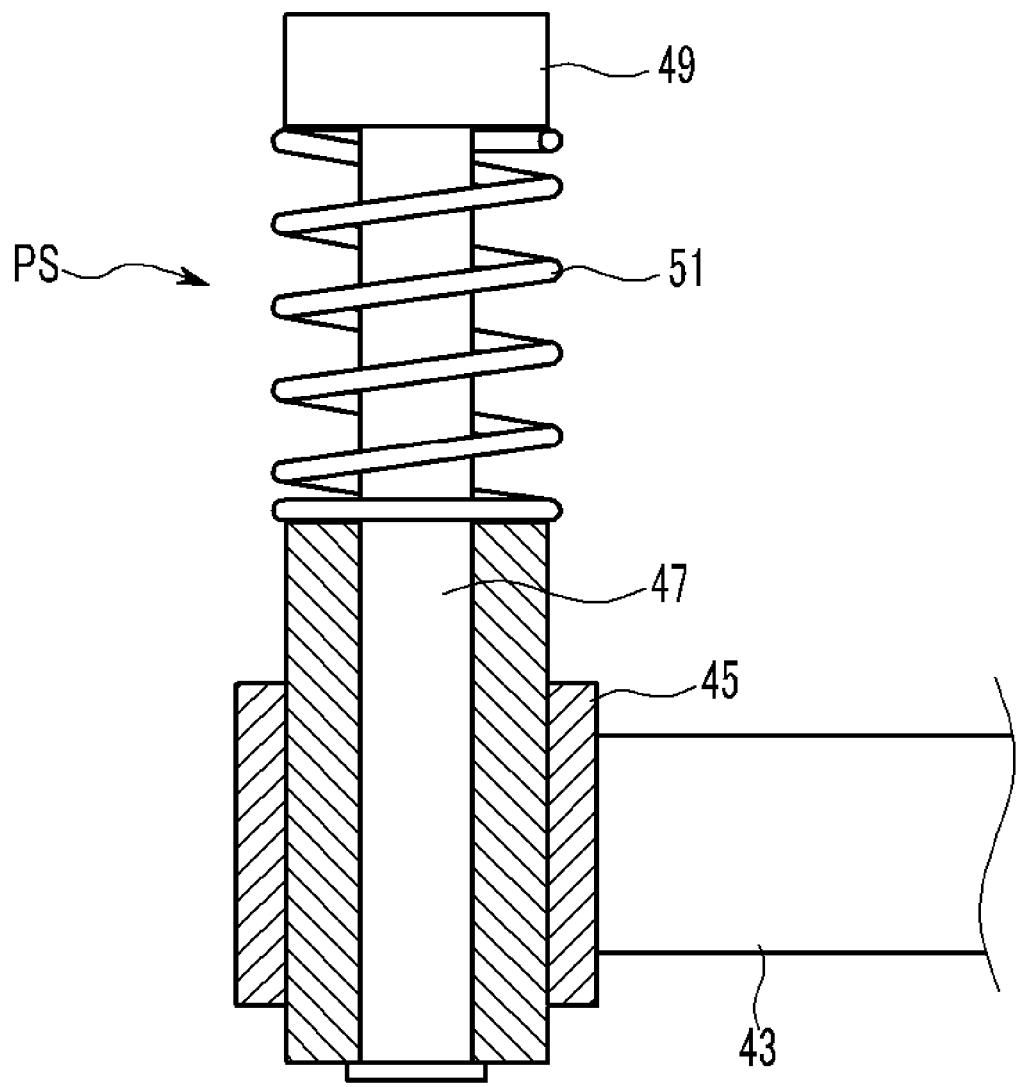
FIG. 8 is an exemplary cross-sectional view taken along the line B-B of FIG. 6.

Preferably, the pushing member PS, for example, as shown in FIG. 8, includes a rod housing 45 mounted respectively at both ends of the hanger frame 43, a pushing rod 47 slidably inserted into the rod housing 45, a rubber pad 49 suitably mounted at the front end of the pushing rod 47, and a spring 51 suitably mounted onto the pushing rod 47 in a state in which one end thereof is supported by the rubber pad 49 and the other end thereof is supported by the rod housing 45.

Preferably, the central pin clamping member C1, as shown in FIG. 7, includes a central air cylinder CY1 fixed to a lower side of the center of the hanger frame 43, and a central clamping pin P suitably connected to the operating rod of the central air cylinder CY1 in a state of being mounted at the front end of the central air cylinder CY1 so as to rotate a clamper disposed therein.

In further preferred embodiments, the left/right pin clamping member C2 includes left/right air cylinders CY2 slidably mounted at both sides thereof along an axial direction with respect to the center of the hanger frame 43, and left/right clamping pins suitably connected to the operating rod of the left/right air cylinders CY2 in a state of being mounted at the front end of the left/right air cylinders CY2 so as to rotate the clamper disposed therein.

Preferably, the parts loading robot 5, for example as shown in FIG. 3, which is suitably disposed at both sides of the rear of the base plate 11, is provided with a clamper 53 at an end of arm thereof to transport the left/right side members SM clamped to the locate unit 1.

According to other preferred embodiments of the invention, the welding robot 7, as shown in FIG. 3, includes a spot welding gun 55 that is suitably disposed at the front end of an arm respectively disposed at both sides of the base plate 11, and the spot welding gun 55 performs a welding process to weld abutments of the left/right side members SM and the dash panel DP.

Therefore, as to an operation of the device for assembling a vehicle body mentioned above, as shown in FIG. 3 to FIG. 9, the parts loading robot 5 clamps the left/right side member SM, and then loads it on three sets of locate units 1 disposed at both sides of the base plate 11.

Accordingly, in certain exemplary embodiment, for example as in D1 to D2 of FIG. 5, the air cylinder 35 controls the clamper 39 to rotate in a state in which the clamping pin 13 is suitably inserted into the tooling hole formed at a lower portion of the left/right side member SM.

Preferably, as shown in FIG. 7, the dash panel DP is clamped by the robot hanger unit 3 of the pin clamp type, and so it is maintained in a state of being fixed between abutments of the left/right side members SM.

In further preferred embodiments, for example as shown in FIG. 3, welding portions of each of the left/right side members and the dash panel DP are suitably welded by the spot welding gun 55 of the welding robot 7.

Accordingly, the left/right side members SM and the dash panel DP are suitably loaded and welded completely in the same process and transported to the unloading process S200 in a state of being clamped by the robot hanger unit 3 controlled by an operation of the handling robot 41.

Preferably, the device for assembling a vehicle body according to an exemplary embodiment of the present invention can correspond to various models of vehicles in a process of manufacturing a vehicle body, and can suitably reduce the number of processes through which the left/right side members SM and the dash panel DP can be held by the locate unit 1 of the three shaft servo control pin clamp type and the tooling hole in the same process, and then the left/right side members SM and the dash panel DP are welded by the both robot hanger unit 3 in a state in which the tooling hole is held by the robot hanger unit 3 of the pin clamp type.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A device for assembling a vehicle body in order to assemble a dash panel to a left side member and a right side member comprises:
   at least three sets of locate units that are disposed at both sides of a base plate, hold side members through a clamping pin inserted into a tooling hole formed at a lower portion of the side members, and control the side members to move in four directions or a vertical direction by three servo motors;
   a robot hanger unit disposed at the front end of an arm of a handling robot disposed at the front side of the base plate in order to load the dash panel between the side members held by the locate unit in a state in which the clamping pin is inserted into a tooling hole formed at a surface of the dash panel, and at the same time to transport the side members and the dash panel assembly to a parts unloading process;
   a parts loading robot respectively disposed at both sides of rearward of the base plate so as to clamp the left/right side members, and to load the side members to the locate unit; and
   a welding robot integrally provided with a spot welding gun at the front end thereof and disposed at both sides of the base plate so as to weld abutments of the side members and the dash panel,
   wherein the locate unit comprises:
   a main plate mounted at one side of the base plate;
   a longitudinal rail mounted at the main plate in a longitudinal direction a longitudinal rail block slidably mounted at the longitudinal rail;
   a longitudinal drive member connected to the longitudinal rail block in a state of being arranged on the main plate along one side of the longitudinal rail so as to slidably move the longitudinal rail block along the longitudinal rail using a rotating force;

a rail plate mounted on an upper surface of the longitudinal rail block;
a traverse rail traversely mounted on the rail plate;
a traverse rail bock slidably mounted at the traverse rail;
a traverse drive member connected to the traverse rail block in a state of being arranged on the rail plate along one side of the traverse rail so as to slidably move the traverse rail block along the traverse rail by using the rotating force;
a slide guider perpendicularly mounted at an upper surface of the traverse rail block;
a vertical slider slidably mounted on the slide guider so as to be moved upward and downward;
a vertical drive member connected to the vertical slider in a state of being arranged perpendicularly on the traverse rail block along one side of the slide guider so as to slidably move the vertical slider along the slide guider by using the rotating force; and
a pin clamping member disposed at an upper end of the vertical slider so as to hold the parts by using air pressure in a state in which a clamping pin is inserted into the tooling hole.

2. The device for assembling a vehicle body of claim 1, wherein the longitudinal drive member comprises:
a longitudinal servo motor that is mounted on the main plate along one side of the longitudinal rail through a mounting block and that is provided with a rotating shaft formed of a screw bar; and
a longitudinal screw block disposed at a surface of the longitudinal rail block so that it is engaged with the screw bar of the longitudinal servo motor.

3. The device for assembling a vehicle body of claim 1, wherein the traverse drive member comprises:
a traverse servo motor that is mounted on the rail plate through a support block along one side of the traverse rail and that is provided with a rotating shaft formed of a screw bar; and
a traverse screw block disposed at a surface of the traverse rail block, so that a vertical screw block is engaged with the screw bar of the traverse servo motor.

4. The device for assembling a vehicle body of claim 1, wherein the vertical drive member comprises:
a vertical servo motor that is perpendicularly mounted on the traverse rail block along one side of the slide guider and that is provided with a rotating shaft formed of a screw bar; and
a vertical screw block disposed at a surface of the vertical slider, and engaged with the screw bar of the vertical servo motor.

5. The device for assembling a vehicle body of claim 1, wherein the pin clamping member comprises:
an air pressure cylinder perpendicularly mounted at an upper end of the vertical slider; and
a clamping pin connected to an operating rod of the air pressure cylinder in a state of being mounted at an upper end of the air pressure cylinder so as to rotate a damper disposed therein.

6. The device for assembling a vehicle body of claim 1, wherein the robot hanger unit comprises:
a hanger frame of a double pipe structure in which the middle portion thereof is fixed to the front end of the handling robot, and aluminum expanded foam is inserted therein;
a pushing member disposed at both ends of the hanger frame so as to support both sides of the dash panel;
a central pin clamping member disposed at a lower side of the center of the hanger frame so as to insert the clamping pin into a tooling hole disposed at a surface of the dash panel and hold the dash panel and that is operated by air pressure; and
left/right pin clamping members slidably mounted at both sides of the hanger frame with respect to the center thereof through which the clamping pin is inserted into the tooling holes formed at a surface of the dash panel so as to hold the dash panel by using air pressure.

7. The device for assembling a vehicle body of claim 6, wherein the pushing member comprises:
a rod housing mounted respectively at both ends of the hanger frame;
a pushing rod slidably inserted into the rod housing;
a rubber pad mounted at the front end of the pushing rod; and
a spring mounted on the pushing rod in such a state that one end thereof is supported by the rubber pad and the other end thereof is supported by the rod housing.

8. The device for assembling a vehicle body of claim 6, wherein the central pin clamping member comprises:
a central air cylinder fixed to a lower side of the center of the hanger frame; and
a central clamping pin connected to the operating rod of the central air cylinder in a state of being mounted at the front end of the central air cylinder so as to rotate a clamper disposed therein.

9. The device for assembling a vehicle body of claim 6, wherein the left/right pin clamping members comprises:
left/right air cylinders slidably mounted at both sides thereof along an axial direction with respect to the center of the hanger frame; and
left/right clamping pins connected to the operating rod of the left/right air cylinders in a state of being mounted at the front end of the left/right air cylinders so as to rotate the damper disposed therein.

10. A device for assembling a vehicle body in order to assemble a dash panel to a left side member and a right side member comprises:
at least three sets of locate units that are disposed at both sides of a base plate, hold side members through a clamping pin inserted into a tooling hole formed at a lower portion of the side members, and control the side members to move in four directions or a vertical direction by three servo motors;
a robot hanger unit disposed at the front end of an arm of a handling robot disposed at the front side of the base plate in order to load the dash panel between the side members held by the locate unit in a state in which the clamping pin is inserted into a tooling hole formed at a surface of the dash panel, and at the same time to transport the side members and the dash panel assembly to a parts unloading process;
a parts loading robot respectively disposed at both sides of rearward of the base plate so as to clamp the left/right side members, and to load the side members to the locate unit; and
a welding robot integrally provided with a spot welding gun at the front end thereof and disposed at both sides of the base plate so as to weld abutments of the side members and the dash panel,
wherein the robot hanger unit comprises;
a hanger frame of a double pipe structure in which the middle portion thereof is fixed to the front end of the handling robot, and aluminum expanded foam is inserted therein;
a pushing member disposed at both ends of the hanger frame so as to support both sides of the dash panel;

a central pin clamping member disposed at a lower side of the center of the hanger frame so as to insert the clamping pin into a tooling hole disposed at a surface of the dash panel and hold the dash panel and that is operated by air pressure; and left/right pin clamping members slidably mounted at both sides of the hanger frame with respect to the center thereof through which the clamping pin is inserted into the tooling holes formed at a surface of the dash panel so as to hold the dash panel by using air pressure.

11. The device for assembling a vehicle body of claim 10, wherein the locate unit comprises:

a main plate mounted at one side of the base plate;

a longitudinal rail mounted at the main plate in a longitudinal direction;

a longitudinal rail block slidably mounted at the longitudinal rail;

a longitudinal drive member connected to the longitudinal rail block in a state of being arranged on the main plate along one side of the longitudinal rail so as to slidably move the longitudinal rail block along the longitudinal rail using a rotating force;

a rail plate mounted on an upper surface of the longitudinal rail block;

a traverse rail traversely mounted on the rail plate;

a traverse rail bock slidably mounted at the traverse rail;

a traverse drive member connected to the traverse rail block in a state of being arranged on the rail plate along one side of the traverse rail so as to slidably move the traverse rail block along the traverse rail by using the rotating force;

a slide guider perpendicularly mounted at an upper surface of the traverse rail block;

a vertical slider slidably mounted on the slide guider so as to be moved upward and downward;

a vertical drive member connected to the vertical slider in a state of being arranged perpendicularly on the traverse rail block along one side of the slide guider so as to slidably move the vertical slider along the slide guider by using the rotating force; and a pin clamping member disposed at an upper end of the vertical slider so as to hold the parts by using air pressure in a state in which a clamping pin is inserted into the tooling hole, and wherein the longitudinal drive member comprises:

a longitudinal servo motor that is mounted on the main plate along one side of the longitudinal rail through a mounting block and that is provided with a rotating shaft formed of a screw bar; and a longitudinal screw block disposed at a surface of the longitudinal rail block so that it is engaged with the screw bar of the longitudinal servo motor.

12. The device for assembling a vehicle body of claim 11, wherein the traverse drive member comprises:

a traverse servo motor that is mounted on the rail plate through a support block along one side of the traverse rail and that is provided with a rotating shaft formed of a screw bar; and a traverse screw block disposed at a surface of the traverse rail block, so that a vertical screw block is engaged with the screw bar of the traverse servo motor.

13. The device for assembling a vehicle body of claim 11, wherein the vertical drive member comprises:

a vertical servo motor that is perpendicularly mounted on the traverse rail block along one side of the slide guider and that is provided with a rotating shaft formed of a screw bar; and a vertical screw block disposed at a surface of the vertical slider, and engaged with the screw bar of the vertical servo motor.

14. The device for assembling a vehicle body of claim 11, wherein the pin clamping member comprises:

an air pressure cylinder perpendicularly mounted at an upper end of the vertical slider; and a clamping pin connected to an operating rod of the air pressure cylinder in a state of being mounted at an upper end of the air pressure cylinder so as to rotate a clamper disposed therein.

15. The device for assembling a vehicle body of claim 10, wherein the pushing member comprises:

a rod housing mounted respectively at both ends of the hanger frame;

a pushing rod slidably inserted into the rod housing;

a rubber pad mounted at the front end of the pushing rod; and a spring mounted on the pushing rod in such a state that one end thereof is supported by the rubber pad and the other end thereof is supported by the rod housing.

16. The device for assembling a vehicle body of claim 10, wherein the central pin clamping member comprises:

a central air cylinder fixed to a lower side of the center of the hanger frame; and a central clamping pin connected to the operating rod of the central air cylinder in a state of being mounted at the front end of the central air cylinder so as to rotate a damper disposed therein.

17. The device for assembling a vehicle body of claim 10, wherein the left/right pin clamping members comprises:

left/right air cylinders slidably mounted at both sides thereof along an axial direction with respect to the center of the hanger frame; and left/right clamping pins connected to the operating rod of the left/right air cylinders in a state of being mounted at the front end of the left/right air cylinders so as to rotate the damper disposed therein.

* * * * *